United States Patent
Yoon

(10) Patent No.: US 7,787,832 B2
(45) Date of Patent: Aug. 31, 2010

(54) APPARATUS FOR TX/RX ANTENNA SWITCH IN TDD WIRELESS COMMUNICATION SYSTEM

(75) Inventor: Hyun-Su Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 11/925,410

(22) Filed: Oct. 26, 2007

(65) Prior Publication Data
US 2008/0102763 A1 May 1, 2008

(30) Foreign Application Priority Data
Oct. 27, 2006 (KR) ............... 10-2006-0105307

(51) Int. Cl.
*H04B 1/44* (2006.01)
(52) U.S. Cl. ............. 455/83; 455/127.1; 455/269; 455/550.1; 342/374; 343/876
(58) Field of Classification Search ............. 455/83, 455/127.1, 269, 550.1, 560, 562.1, 569, 341, 455/414.1, 78; 342/374; 343/876
See application file for complete search history.

(56) References Cited

U.S. PATENT DOCUMENTS

| 3,842,419 | A | * | 10/1974 | Arndt | 342/458 |
|---|---|---|---|---|---|
| 4,032,922 | A | * | 6/1977 | Provencher | 342/373 |
| 4,511,813 | A | * | 4/1985 | Pan | 327/431 |
| 4,692,714 | A | * | 9/1987 | Galani | 331/1 R |
| 4,814,777 | A | * | 3/1989 | Monser | 343/727 |
| 4,884,077 | A | * | 11/1989 | Landt | 342/202 |
| 4,951,013 | A | * | 8/1990 | DeCormier et al. | 333/117 |
| 4,952,941 | A | * | 8/1990 | Landt | 342/202 |
| 5,659,322 | A | * | 8/1997 | Caille | 342/188 |
| 6,608,595 | B1 | * | 8/2003 | Louzir | 343/700 MS |
| 6,697,017 | B1 | * | 2/2004 | Shmuel | 342/378 |
| 6,950,634 | B2 | * | 9/2005 | Dykstra et al. | 455/78 |
| 7,561,854 | B2 | * | 7/2009 | Manicone | 455/83 |
| 2003/0220081 | A1 | * | 11/2003 | Dykstra et al. | 455/78 |
| 2008/0132180 | A1 | * | 6/2008 | Manicone | 455/83 |

FOREIGN PATENT DOCUMENTS

| KR | 10-2004-0054943 A | 6/2004 |
|---|---|---|
| KR | 10-2006-0010677 A | 2/2006 |
| KR | 10-2006-0019469 A | 3/2006 |

* cited by examiner

*Primary Examiner*—Minh D Dao
(74) *Attorney, Agent, or Firm*—Jefferson IP Law, LLP

(57) ABSTRACT

An apparatus including a TX/RX antenna switch (TRAS) in a time division duplex (TDD) wireless communication system is provided. In particular, an apparatus for protecting an RX low-noise amplifier (LNA) from a radio-frequency (RF) TX signal using a 180° hybrid coupler is provided. The TRAS apparatus includes a 180° hybrid coupler, a phase shifter and a combiner/divider unit.

9 Claims, 3 Drawing Sheets

APPARATUS FOR TX/RX ANTENNA SWITCH IN TDD WIRELESS COMMUNICATION SYSTEM

PRIORITY

This application claims the benefit under 35 U.S.C. §119 (a) to a Korean patent application filed in the Korean Intellectual Property Office on Oct. 27, 2006 and assigned Serial No. 2006-0105307, the entire disclosure of which is hereby incorporated by reference.

BACKGROUND OF THE INVENTION

1. Field of the Invention

The present invention relates generally to an apparatus including a Transmission/Reception (TX/RX) antenna switch in a time division duplex (TDD) wireless communication system. More particularly, the present invention relates to an apparatus for protecting an RX low-noise amplifier (LNA) from a radio-frequency (RF) TX signal using a 180° hybrid coupler.

2. Description of the Related Art

In a TDD wireless communication system, the same frequency is time-divided for both a transmission signal and a reception signal. A TDD wireless communication system includes a TX/RX antenna switch (TRAS) unit that performs switching between a high-power RF TX signal and a low-power RF RX signal. In a TX mode, the TRAS unit protects an RX LNA by blocking TX power flowing into the RX LNA. In an RX mode, the TRAS unit prevents a decrease in RX sensitivity by reducing a noise received from the TX side.

FIG. 1 is a block diagram illustrating a conventional TDD wireless communication system using a TRAS unit.

Referring to FIG. 1, the conventional TDD wireless communication system includes a TDD controller 100, a transmitter 102, a power amplifier (PA) 104, a receiver 106, an LNA 108, a TRAS unit 110, a front-end unit 112 and an antenna 114.

The TDD controller 100 generates a control signal for controlling an operation of a TX/RX mode according to the time-division scheme and outputs the generated control signal to the transmitter 102, the receiver 106 and the TRAS unit 110.

The PA 104 amplifies a TX signal output from the transmitter 102 into a high-power TX signal and outputs the high-power TX signal to the TRAS unit 110. The LNA 108 amplifies an output signal of the TRAS unit 110 and outputs the resulting signal to the receiver 106.

In response to the control signal received from the TDD controller 100, the TRAS unit 110 switches between TX and RX paths to perform an operation of a TX/RX mode. That is, if the control signal received from the TDD controller 100 indicates a TX mode operation, the TRAS unit 110 connects (creates) a TX path from the PA 104 to the antenna 114 to output the high-power TX signal received from the transmitter 102 to the front-end unit 112 and to prevent the high-power TX signal from flowing into the LNA 108. If the received control signal indicates an RX mode operation, the TRAS unit 110 connects (creates) an RX path from the antenna 114 to the LNA 108 to output an RX signal received from the front-end unit 112 to the LNA 108 and to block a noise received from the PA 104.

Because an insertion loss of the TX path may affect the capacity of the PA in the TX mode, the TRAS unit 110 must be designed and configured in such a way to minimize the insertion loss of the TX path and to isolate the LNA from the TX path. Also, because an insertion loss of the RX path and a noise level of the input signal of the LNA may affect the RX performance in the RX mode, the TRAS unit must be designed and configured in such a way to minimize the insertion loss of the RX path and to isolate the output terminal of the PA from the RX path.

Conventionally, the TRAS unit 110 is implemented using an RF switch or circulator, thereby isolating the TX and RX paths to protect the LNA 108. However, if there is a failure in the power supply of the TRAS unit using the RF switch or circulator, the TX and RX paths cannot be isolated and the LNA cannot be protected.

SUMMARY OF THE INVENTION

An aspect of the present invention is to address at least the above problems and/or disadvantages and to provide at least the advantages described below. Accordingly, an aspect of the present invention is to provide an apparatus including a TX/RX antenna switch in a TDD wireless communication system.

Another aspect of the present invention is to provide an apparatus for protecting an RX LNA from a high-power RF TX signal in a TX mode in a TDD wireless communication system.

Still another aspect of the present invention is to provide an apparatus for protecting an RX LNA in a TDD wireless communication system even when no power is supplied to a TRAS apparatus.

Even another aspect of the present invention is to provide an apparatus for protecting an RX LNA in a TDD wireless communication system when a TX signal is reflected due to the failure of a TX path.

Yet another aspect of the present invention is to provide an apparatus for increasing the isolation between TX and RX paths in a TDD wireless communication system using a 180° hybrid coupler.

According to one aspect of the present invention, a TRAS apparatus in a TDD wireless communication system is provided. The TRAS apparatus includes a 180° hybrid coupler for dividing a TX signal received from a power amplifier of a transmitter into two in-phase signals and for outputting the two in-phase signals to a phase shifter, and for combining two signals with a phase difference of 180° received from the phase shifter and outputting the resulting signal to a LNA of a receiver, the phase shifter for shifting the phases of two signals received from the 180° hybrid coupler by the same predetermined degree and for outputting the resulting signals to a combiner/divider unit, and for shifting two in-phase signals received from the combiner/divider unit into signals with a phase difference of 180° and for outputting the resulting signals to the 180° hybrid coupler and the combiner/divider unit for combining two in-phase signals received from the phase shifter and for outputting the resulting signal to an antenna, and for dividing an RX signal received from the antenna into two in-phase signals and for outputting the resulting two in-phase signals to the phase shifter.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A feature of the present invention is intended to provide an apparatus for protecting an RX LNA from a high-power RF TX signal in a TDD wireless communication system by increasing the isolation between TX and RX paths using a 180° hybrid coupler.

FIGS. 2A to 2D are diagrams illustrating an operation of a 180° hybrid coupler in a TRAS apparatus according to an exemplary embodiment of the present invention. In one example, the 180° hybrid coupler has four ports and has a 180° phase difference between two output ports.

Figure 1:
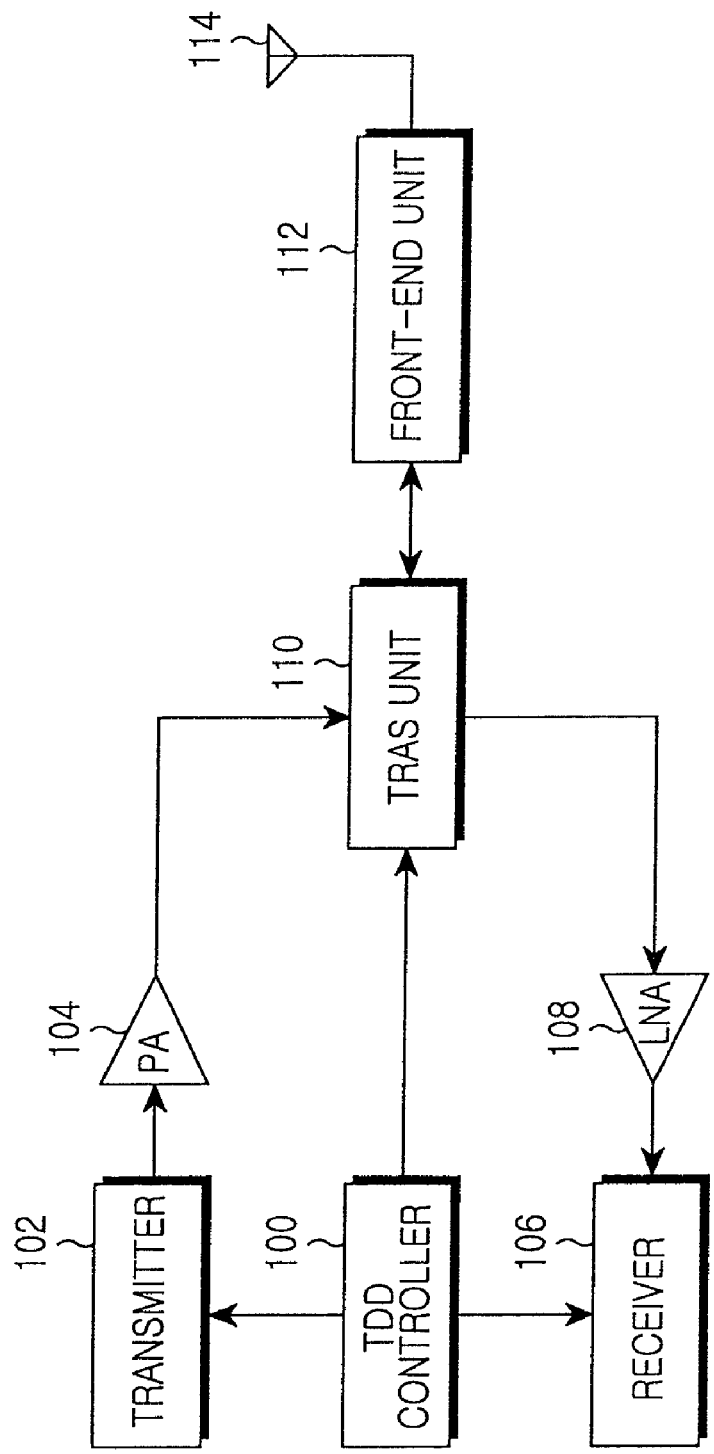
FIG. 1 is a block diagram illustrating a conventional TDD wireless communication system using a TRAS unit.
Figure 2A:
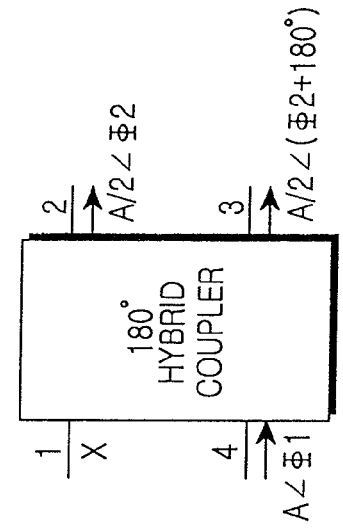
FIGS. 2A to 2D are diagrams illustrating an operation of a 180° hybrid coupler in a TRAS apparatus according to an exemplary embodiment of the present invention.

Referring to FIG. 2A, when a signal is input to a port 1, the 180° hybrid coupler divides the input signal into two in-phase signals having an amplitude of ½, outputs the two in-phase signals respectively to ports 2 and 3, and isolates a port 4 to prevent the input signal from being output to the port 4. For example, when a signal having an amplitude of A and a phase of ∠φ1 is input to the port 1, the 180° hybrid coupler divides the input signal into two in-phase signals having an amplitude of A/2 and a phase of ∠φ2. The 180° hybrid coupler outputs the two in-phase signals respectively to the ports 2 and 3.

Figure 2B:
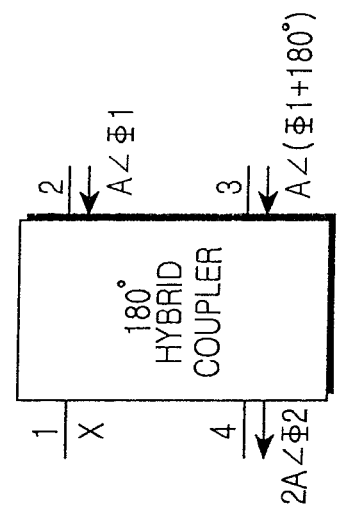

Referring to FIG. 2B, when a signal is input to the port 4, the 180° hybrid coupler divides the input signal into two signals having an amplitude of ½ and a phase difference of 180°, outputs the two signals respectively to the ports 2 and 3, and isolates the port 1 to prevent the input signal from being output to the port 1. For example, when a signal having an amplitude of A and a phase of ∠φ1 is input to the port 4, the 180° hybrid coupler divides the input signal into a signal having an amplitude of A/2 and a phase of ∠φ2 and a signal having an amplitude of A/2 and a phase of ∠(φ2+180°) and outputs the two signals respectively to the ports 2 and 3 while isolating the port 1.

Figure 2C:
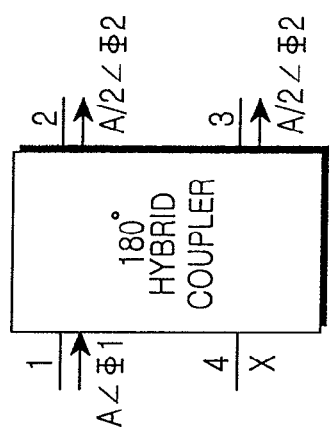

Referring to FIG. 2C, when two in-phase signals having the same amplitude are input respectively to the ports 2 and 3, the 180° hybrid coupler combines the two input in-phase signals, outputs the resulting signal to the port 1, and isolates the port 4 to prevent the input signals from being output to the port 4. For example, when two in-phase signals, each having an amplitude of A and a phase of ∠φ1, are input respectively to the ports 2 and 3, the 180° hybrid coupler combines the two input in-phase signals and outputs the resulting signal having an amplitude of 2A and a phase of ∠φ2 to the port 1 while isolating the port 4.

Figure 2D:
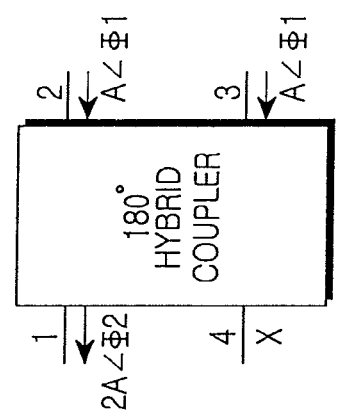

Referring to FIG. 2D, when two signals having the same amplitude and a phase difference of 180° are input respectively to the ports 2 and 3, the 180° hybrid coupler combines the two input signals, outputs the resulting signal to the port 4, and isolates the port 1 to prevent the input signals from being output to the port 1. For example, when a signal having an amplitude of A and a phase of ∠φ1 and a signal having an amplitude of A and a phase of ∠(φ1+180°) are input respectively to the ports 2 and 3, the 180° hybrid coupler combines the two input signals and outputs the resulting signal having an amplitude of 2A and a phase of ∠φ2 to the port 4 while isolating the port 1.

Hereinafter, a description will be given of the construction of an exemplary TRAS apparatus using the above characteristics of the 180° hybrid coupler.

Figure 3:
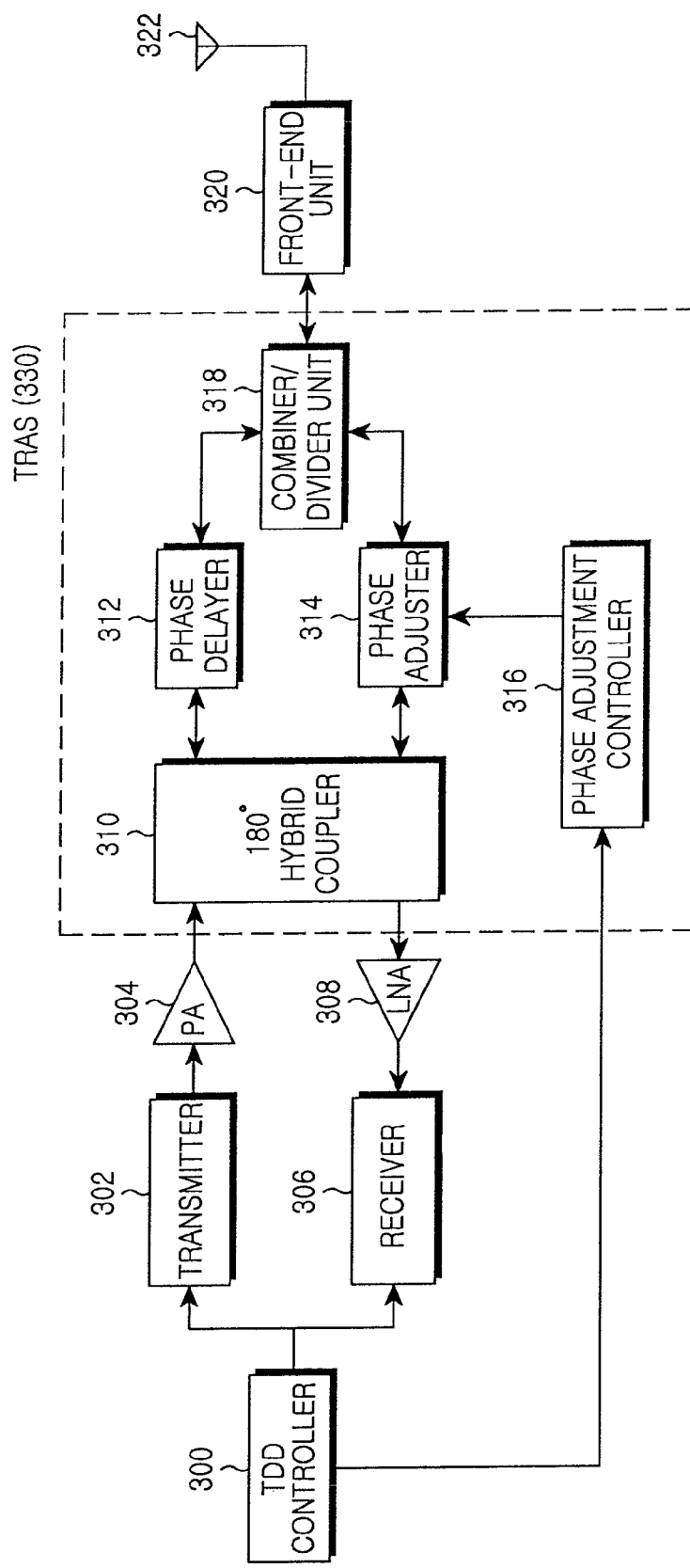
FIG. 3 is a block diagram illustrating a TRAS apparatus in a TDD wireless communication system according to an exemplary embodiment of the present invention.

FIG. 3 illustrates a block diagram of the TRAS apparatus in a TDD wireless communication system according to an exemplary embodiment of the present invention.

Referring to FIG. 3, an exemplary TDD wireless communication system includes a TDD controller 300, a transmitter 302, a PA 304, a receiver 306, an LNA 308, a TRAS apparatus 330, a front-end unit 320 and an antenna 322. The TRAS apparatus 330 includes a 180° hybrid coupler 310, a phase delayer 312, a phase adjuster 314, a phase adjustment controller 316 and a combiner/divider unit 318. The phase delayer 312 and the phase adjuster 314 constitute a phase shifter. Although not illustrated in FIG. 3, an isolator may be provided between the 180° hybrid coupler 310 and the output terminal of the PA 304.

The TDD controller 300 generates a control signal for controlling an operation of a TX/RX mode according to the time-division scheme and outputs the generated control signal to the transmitter 302, the receiver 306 and the phase adjustment controller 316.

The PA 304 amplifies a TX signal output from the transmitter 302 into a high-power TX signal and outputs the high-power TX signal to the 180° hybrid coupler 310. The LNA 308 amplifies an output signal of the 180° hybrid coupler 310 and outputs the resulting signal to the receiver 306.

In a TX mode, according to the characteristics illustrated in FIG. 2A, the 180° hybrid coupler 310 receives a high-power TX signal from the PA 304, divides the TX signal into two in-phase signals having an amplitude of ½, outputs the two in-phase signals respectively to the phase delayer 312 and the phase adjuster 314, and prevents the TX signal from being output to the LNA 308. In an RX mode, according to the characteristics illustrated in FIG. 2D, the 180° hybrid coupler 310 receives two RX signals having the same amplitude and a phase difference of 180° from the phase delayer 312 and the phase adjuster 314, combines the two RX signals, outputs the resulting signal to the LNA 308 and prevents the RX signals from being output to the PA 304.

The 180° hybrid coupler 310 performs its normal operation even when no power is applied to the TRAS apparatus 330 due to, for example, the failure of a system power supply or if the TRAS apparatus 330 is turned off. Therefore, even when no power is supplied to the TRAS apparatus 330 during the TX mode operation of the system, the 180° hybrid coupler 310 can prevent the RF TX signal of the transmitter 302 from being input into the LNA 308. Also, even when a TX signal is reflected and input into the TRAS apparatus 330 because of a malfunction or an abnormal connection of the antenna 322 or the front-end unit 320, the 180° hybrid coupler 310 returns the reflected RX signal to the transmitter 302 according to the characteristics illustrated in FIG. 2C, thereby protecting the LNA 308. In this case, the reflected TX signal is absorbed by the isolator.

The phase adjustment controller 316 receives a TX/RX mode signal from the TDD controller 300, converts the TX/RX mode signal into a control signal recognizable by the phase adjuster 314 and outputs the resulting control signal to the phase adjuster 314. For example, the TX/RX mode signal may be converted into '0' or '1'.

The phase adjuster 314 detects a TX/RX mode according to the control signal received from the phase adjustment controller 316 and adjusts the phase of an input signal differently depending on the detected TX/RX mode. That is, if the control signal indicates the TX mode, the phase adjuster 314 shifts the phase of a TX signal received from the 180° hybrid coupler 310 by a predetermined degree and outputs the resulting signal to the combiner/divider unit 318. On the other hand, if the control signal indicates the RX mode, the phase adjuster 314 shifts the phase of an RX signal received from the combiner/divider unit 318 by the predetermined degree plus 180°, and outputs the resulting signal to the 180° hybrid coupler 310. The predetermined degree denotes the inherent phase shift degree of the phase adjuster 314. The phase adjuster 314 performs the same operation as above even when no power is applied to the TRAS apparatus 330 because of, for example, a failure of the system power supply or if the TRAS apparatus 330 is turned off.

The phase delayer 312 shifts the phase of an input signal by a predetermined phase degree irrespective of the TX/RX mode. That is, the phase delayer 312 shifts an input signal from the 180° hybrid coupler 310 by the predetermined phase degree and outputs the resulting signal to the combiner/divider unit 318. Likewise, the phase delayer 312 shifts an input signal from the combiner/divider unit 318 by the predetermined phase degree and outputs the resulting signal to the 180° hybrid coupler 310. The predetermined phase degree is equal to the inherent phase shift degree of the phase adjuster 314.

The combiner/divider unit 318 receives two in-phase TX signals having the same amplitude from the phase delayer 312 and the phase adjuster 314, combines the two in-phase TX signals and outputs the resulting signal to the front-end unit 320. Also, the combiner/divider unit 318 divides an input signal from the front-end unit 320 into two in-phase signals having an amplitude of ½ and outputs the two in-phase signals respectively to the phase delayer 312 and the phase adjuster 314.

Hereinafter, a description will be given of the detailed operation based on the constructions of FIGS. 2A to 2D and 3.

In a TX mode, a TX signal output through the transmitter 320 and the PA 304 is transmitted through the path of the isolator (not shown)→the 180° hybrid coupler 310→the phase delayer 312 and the phase adjuster 314→the combiner/divider unit 318→the front-end unit 320→the antenna 322. In the TX mode, it is important to prevent the high-power TX signal of the transmitter 302 from being input into the LNA 308.

A TX signal output from the PA 304 is input through the isolator (not shown) into the 180° hybrid coupler 310. The input TX signal is divided by the 180° hybrid coupler 310 into two in-phase signals having an amplitude of ½ and the two in-phase signals are input respectively into the phase delayer 312 and the phase adjuster 314. At this point, according to the characteristics illustrated in FIG. 2A, the connection path with the LNA 308 is isolated to prevent the TX signal from being input to the LNA 308. The two TX signals input into the phase delayer 312 and the phase adjuster 314 are phase-shifted by the same degree and the resulting signals are input into the combiner/divider unit 318. The phase-shifted signals are combined by the combiner/divider unit 318 and the resulting signal is input into the front-end unit 320. The signal input into the front-end unit 320 is transmitted through the antenna 322.

The TRAS apparatus 330 operates normally even when no power is applied to the TRAS apparatus 330 during the TX mode operation of the system due to, for example, a failure of the system power supply or if the TRAS apparatus 330 is turned off. Therefore, the high-power RF TX signal can be prevented from being input into the LNA 308. Also, when the high-power RF TX signal is reflected and returned to the TRAS apparatus 330 because of a failure of the TX path, i.e., a failure of the front-end unit 320 or the antenna 322 during the TX mode operation, the TX signal is output to the PA 304 but is not input into the LNA 308 according to the characteristics of the 180° hybrid coupler 310 illustrated in FIG. 2C. The reflected TX signal output to the PA 304 does not affect the PA 304 because it is absorbed by the isolator (not illustrated) included in the output terminal of the PA 304. In an exemplary embodiment, the isolator may be included in the PA 304.

In an RX mode, an RX signal received through the antenna 322 is input into the LNA 308 through the path of the front-end unit 320→the combiner/divider unit 318→the phase adjuster 314 and the phase delayer 312→the 180° hybrid coupler 310. In the RX mode, it is important to reduce a signal loss that is generated between the antenna 322 and the LNA 308 to improve the system noise figure (NF).

An RX signal received through the antenna 322 is input through the front-end unit 320 into the combiner/divider unit 318. The input RX signal is divided by the combiner/divider unit 318 into two in-phase signals having an amplitude of ½. The two in-phase signals are input respectively into the phase delayer 312 and the phase adjuster 314. The two RX signals input into the phase delayer 312 and the phase adjuster 314 are phase-shifted to have a phase difference of 180° and the resulting signals are input into the 180° hybrid coupler 310. The two RX signals having a phase difference of 180° are combined by the 180° hybrid coupler 310 and the resulting signal is low-noise amplified by the LNA 308. The low-noise amplified signal is input into the receiver 306. At this point, the TX path of the PA 304 is isolated according to the characteristics of the 180° hybrid coupler illustrated in FIG. 2D, thereby preventing the input of the high-power RF TX signal from the PA 304. Thus, the loss of the RX signal can be reduced.

According to exemplary embodiments of the present invention, the TRAS apparatus 330 can protect the RX LNA by isolating the RX path from the TX path irrespective of the normal/abnormal state of the TX path in the TX mode. Also, the TRAS apparatus 330 can minimize the path loss by isolating the TX path from the RX signal in the RX mode.

As described above, exemplary embodiments of the present invention can protect the RX LNA from the high-power RF TX signal in the TDD wireless communication system by increasing the isolation between the TX and RX paths using the 180° hybrid coupler. Also, exemplary embodiments of the present invention can protect the RX LNA from the high-power RF TX signal even in abnormal situations, for example, even when no power is supplied to the TRAS apparatus. Also, exemplary embodiments of the present invention can reduce the fabrication cost of the TDD system and increase the stability and the space utilization of the TDD system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A TX/RX antenna switch (TRAS) apparatus in a time division duplex (TDD) wireless communication system, comprising:
    a 180° hybrid coupler;
    a phase shifter; and
    a combiner/divider unit,
    wherein the 180° hybrid coupler divides a signal received from a transmitter into two in-phase signals and outputs the two in-phase signals to the phase shifter, and combines two signals with a phase difference of 180° received from the phase shifter and outputs the resulting signal to a receiver,
    wherein the phase shifter shifts the phases of two signals received from the 180° hybrid coupler by the same degree and outputs the resulting signals to the combiner/divider unit, and shifts two in-phase signals received from the combiner/divider unit into signals with a phase difference of 180° and outputs the resulting signals to the 180° hybrid coupler,
    and further wherein the combiner/divider unit combines two in-phase signals received from the phase shifter and outputs the resulting signal to an antenna, and divides an RX signal received from the antenna into two in-phase signals and outputs the resulting two in-phase signals to the phase shifter.

2. The TRAS apparatus of claim 1, wherein the signal received by the 180° hybrid coupler from the transmitter comprises a TX signal received from a power amplifier of the transmitter and further wherein the outputting of the resulting signal by the 180° hybrid coupler to the receiver comprises outputting the resulting signal to a low-noise amplifier of the receiver.

3. The TRAS apparatus of claim 2, wherein the 180° hybrid coupler isolates a path connected to the low-noise amplifier of the receiver during a TX mode operation of a system and isolates a path connected to the power amplifier of the transmitter during an RX mode operation of the system.

4. The TRAS apparatus of claim 2, wherein the phase shifter comprises:
    a phase delayer for shifting the phase of an input signal by the degree irrespective of the TX/RX mode; and
    a phase adjuster for shifting the phase of an input signal by the degree during the TX mode operation of the system and shifting the phase of an input signal during the RX mode operation of the system such that the input signal has a 180° phase difference with respect to the output signal of the phase delayer.

5. The TRAS apparatus of claim 4, further comprising a TDD controller for generating a control signal indicating the TX mode operation or the RX mode operation and for outputting the generated control signal to the phase adjuster.

6. The TRAS apparatus of claim 5, further comprising a phase adjustment controller for converting the control signal output from the TDD controller into a control signal recognizable by the phase adjuster.

7. The TRAS apparatus of claim 2, wherein when two in-phase signals are received from the phase adjuster, the 180° hybrid coupler outputs the signal to the power amplifier of the transmitter and isolates the path connected to the low-noise amplifier of the receiver.

8. The TRAS apparatus of claim 2, further comprising an isolator disposed between the power amplifier and the 180° hybrid coupler to absorb a TX signal that is reflected and returned due to a malfunction of at least one of the antenna and a front-end unit.

9. The TRAS apparatus of claim 1, wherein the 180° hybrid coupler operates normally irrespective of being supplied power.

* * * * *